United States Patent
Choi et al.

(10) Patent No.: US 7,450,906 B2
(45) Date of Patent: Nov. 11, 2008

(54) METHOD AND APPARATUS FOR REMOVING CROSS MODULATION NOISE IN A WIRELESS TRANSCEIVER

(75) Inventors: Hee-Chan Choi, Suwon-si (KR); Hyung-Weon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 535 days.

(21) Appl. No.: 11/286,171

(22) Filed: Nov. 23, 2005

(65) Prior Publication Data
US 2006/0111132 A1   May 25, 2006

(30) Foreign Application Priority Data
Nov. 24, 2004   (KR) .................. 10-2004-0097131

(51) Int. Cl.
*H04B 1/00* (2006.01)
(52) U.S. Cl. ............... 455/63.1; 455/67.13; 455/278.1; 455/295
(58) Field of Classification Search ............ 455/63.1, 455/67.11, 67.13, 78, 83, 114.2, 115.1, 115.3, 455/126, 127.1, 127.2, 272, 277.1, 277.2, 455/278.1, 295, 296, 303, 307, 339; 375/219, 375/222
See application file for complete search history.

(56) References Cited

U.S. PATENT DOCUMENTS

| | | | | |
|---|---|---|---|---|
| 4,476,575 A | * | 10/1984 | Franke et al. | .................. 455/78 |
| 5,862,461 A | * | 1/1999 | Yoshizawa et al. | .......... 455/126 |
| 6,212,174 B1 | * | 4/2001 | Lomp et al. | .............. 455/67.11 |
| 6,819,938 B2 | * | 11/2004 | Sahota | .................... 455/127.1 |
| 7,113,752 B2 | * | 9/2006 | Leinonen et al. | .............. 455/78 |

* cited by examiner

*Primary Examiner*—Quochien B Vuong
(74) *Attorney, Agent, or Firm*—The Farrell Law Firm, PC

(57) ABSTRACT

A method and apparatus are provided for removing cross modulation (CM) noise in a wireless transceiver. A determination is made as to whether a transmission signal to be supplied to a transmitter of the wireless transceiver is present. If the transmission signal is present, a level of the transmission signal is determined. When a value of the transmission signal level is equal to or greater than a predetermined value, a first number of filtering operations are performed on a received signal to be input into a receiver of the wireless transceiver. However, when no transmission signal is present or the value of the transmission signal level is less than the predetermined value, a second number of filtering operations are performed on the received signal to be input into the receiver of the wireless transceiver. The first number of filtering operations being greater than the second number of filtering operations.

6 Claims, 3 Drawing Sheets

METHOD AND APPARATUS FOR REMOVING CROSS MODULATION NOISE IN A WIRELESS TRANSCEIVER

PRIORITY

This application claims priority to an application entitled "METHOD AND APPARATUS FOR REMOVING CROSS MODULATION NOISE IN A WIRELESS TRANSCEIVER", filed in the Korean Intellectual Property Office on Nov. 24, 2004 and assigned Serial No. 2004-97131, the entire contents of which are incorporated herein by reference.

BACKGROUND OF THE INVENTION

1. Field of the Invention

The present invention relates generally to a mobile terminal, and more particularly to a method and apparatus for removing cross modulation (CM) noise in a wireless transceiver of a mobile terminal.

2. Description of the Related Art

Conventionally, a mobile terminal includes a wireless transceiver for transmitting and receiving data using a wireless signal. The wireless transceiver uses a diversity structure with two receivers to increase the reception performance.

In the mobile terminal with the wireless transceiver of the diversity structure, an important factor for determining reception sensitivity is cross modulation (CM) noise. The CM noise is a non-linear component occurring in an active device. The CM noise usually occurs in a low noise amplifier (LNA) and a mixer of the wireless transceiver.

The CM noise will be described in detail with reference to FIGS. 1A, 1B and 1C. A signal is transmitted from a transmitter through an antenna, and simultaneously the transmitted signal is undesirably received at a receiver through a duplexer. FIG. 1A illustrates frequency bands of received and transmitted signals.

As mentioned above, a transmitted signal undesirably received at the receiver is removed by a band pass filter (BPF) or duplexer isolation, etc., such that the transmitted signal of the transmission frequency band remaining in the received signal is abruptly reduced as illustrated in FIG. 1B.

The transmitted signal still remaining in the received signal is modulated with a single tone jammer in band while going through the LNA or mixer, resulting in CM noise as illustrated in FIG. 1C.

Because the transmitted signal undesirably received at a main receiver through the duplexer is conventionally removed by the duplexer isolation and a second BPF, CM noise is reduced in the main receiver.

SUMMARY OF THE INVENTION

However, because a duplexer and a BPF are not conventionally provided in a sub-receiver when two receivers are provided in the wireless transceiver, significant CM noise may abruptly increase in the sub-receiver.

Accordingly, a need exists for a technique capable of removing CM noise in a wireless transceiver of a diversity structure.

Therefore, it is an aspect of the present invention to provide a method and apparatus to remove cross modulation (CM) noise in a wireless transceiver of a diversity structure with two receivers.

It is another aspect of the present invention to provide a method and apparatus that remove cross modulation (CM) noise without increasing the size of a sub-receiver.

The above and other aspects of the present invention can be achieved by a method for removing noise in a wireless transceiver. The method includes determining if a transmission signal to be supplied to a transmitter of the wireless transceiver is present; determining a level of the transmission signal if the transmission signal is present; performing a first number of filtering operations on a received signal to be input into a receiver of the wireless transceiver when a value of the transmission signal level is equal to or greater than a predetermined value; and performing a second number of filtering operations on the received signal to be input into the receiver of the wireless transceiver when no transmission signal is present or the value of the transmission signal level is less than the predetermined value, wherein the first number is greater then the second number.

The above and other aspects of the present invention can be achieved by an apparatus for removing noise in a wireless transceiver. The apparatus includes a transmitter for receiving a baseband transmission signal, converting the transmission signal into a signal capable of being transmitted by wireless, and transmitting the wireless signal through a first antenna; a first receiver for receiving a wireless signal through the first antenna and converting the received signal into a baseband received signal; a duplexer for supplying the transmission signal from the transmitter to the first antenna, and supplying the received signal from the first antenna to the first receiver; a second receiver for receiving a wireless signal through a second antenna and converting the received signal into a baseband received signal; a filter unit connected between the second antenna and the second receiver, wherein the number of filters of the filter unit to be connected to a reception path is controlled according to a switching control signal; and a modulator-demodulator (MODEM) for controlling the number of filters to be connected to the reception path according to a presence and level of the transmission signal.

BRIEF DESCRIPTION OF THE DRAWINGS

The above and other aspects and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description, a detailed description of known functions and configurations incorporated herein will be omitted for conciseness.

The present invention limits the occurrence of cross modulation (CM) noise caused by a transmitted signal undesirably received by installing two band pass filters (BPFs) between a sub-antenna and a sub-receiver without increasing a size of the sub-receiver.

More specifically, the present invention serially connects one or two BPFs based on the presence of a transmission signal, thereby addressing a problem in which the reception sensitivity is degraded by filtering operations of the two BPFs on a received signal when a transmission signal is absent.

Figure 1A:
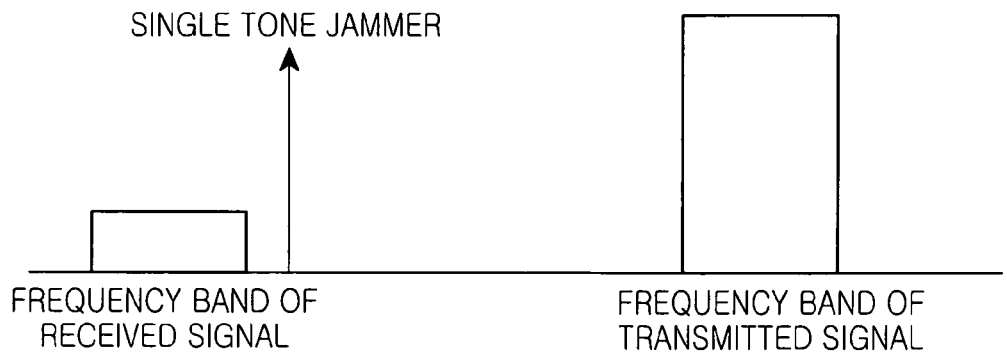
FIGS. 1A, 1B and 1C illustrate a process in which cross modulation (CM) noise occurs in a wireless transceiver of a diversity structure.
Figure 1B:
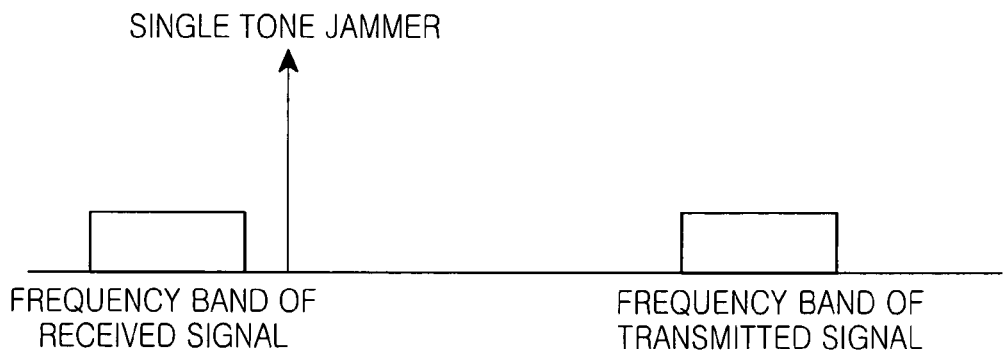
Figure 1C:
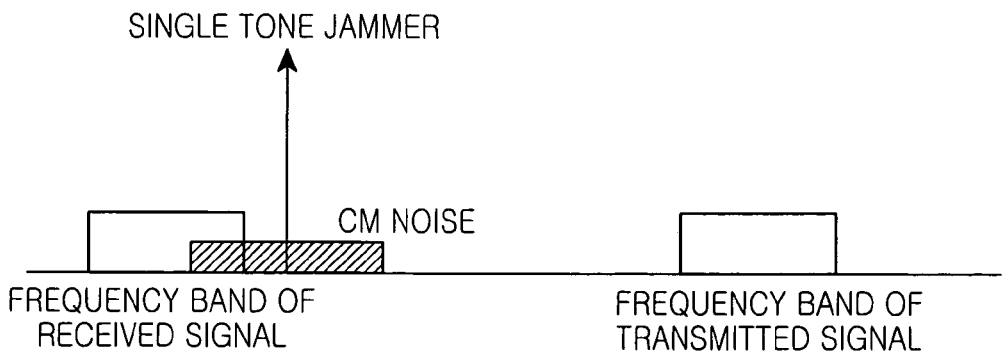
Figure 2:
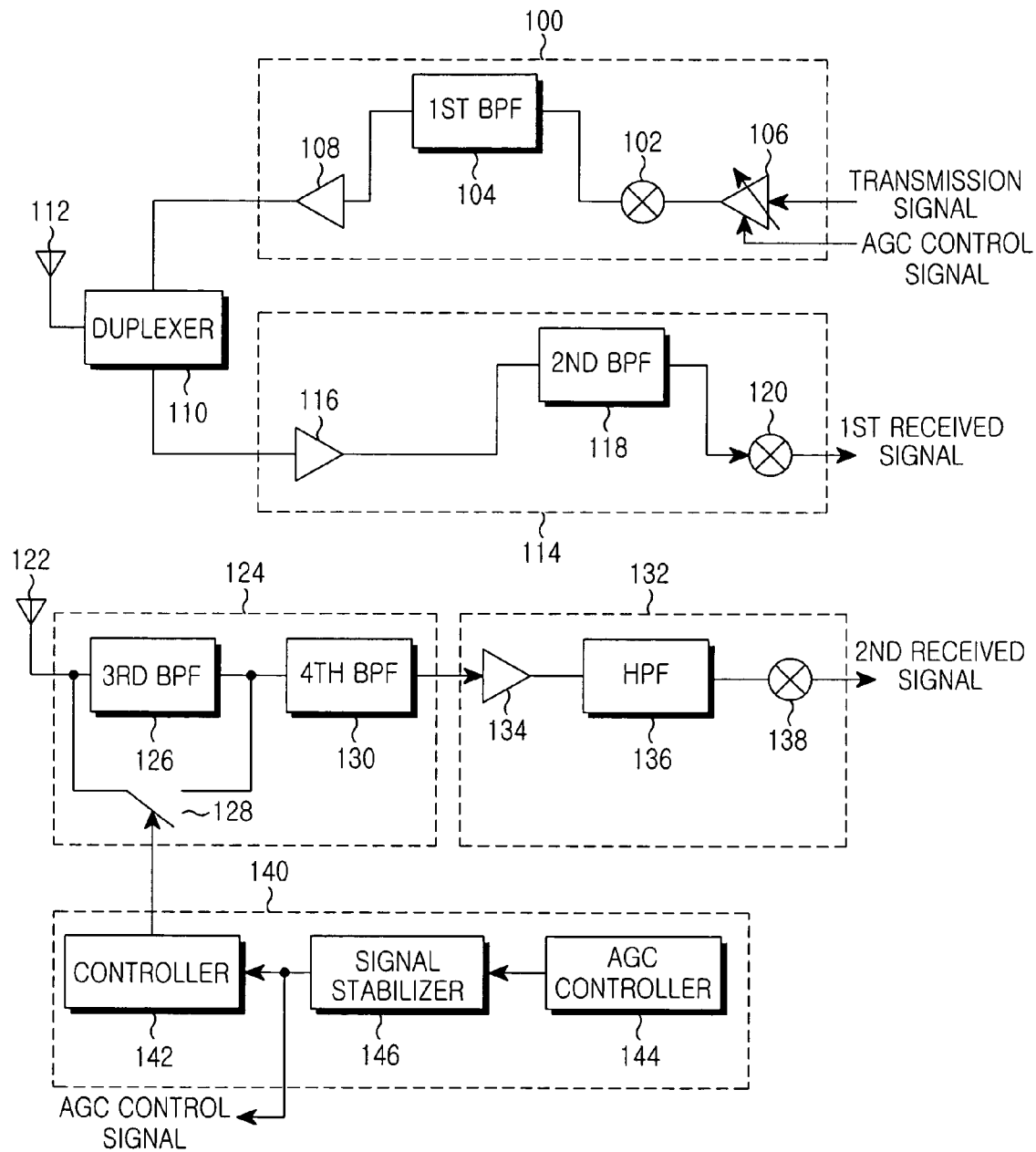
FIG. 2 is a block diagram illustrating a filter control apparatus for use in a wireless transceiver in accordance with a preferred embodiment of the present invention.

A wireless transceiver of a diversity structure in accordance with a preferred embodiment of the present invention will be described with reference to FIG. 2.

The wireless transceiver includes a transmitter 100, a duplexer 110, a first receiver 114 serving as a main receiver, a second receiver 132 serving as a sub-receiver, and a BPF unit 124.

The transmitter 100 includes an auto gain control (AGC) circuit 106 for receiving a baseband transmission signal and performing an AGC operation thereon, a first mixer 102 for mixing with a predetermined frequency the baseband transmission signal based on a result of the AGC operation, a first BPF 104 for receiving an output of the first mixer 102 and passing and outputting only a frequency band of the transmission signal, and a power amplifier (PA) 108 for receiving and power amplifying an output of the first BPF 104 and supplying the duplexer 110 with a result of the power amplification.

The first receiver 114 serving as the main receiver includes a first low noise amplifier (LNA) 116 for receiving a signal through the duplexer 110 and amplifying the received signal, a second BPF 118 for receiving an output of the first LNA 116 and passing and outputting only a frequency band of the received signal, and a second mixer 120 for receiving an output of the second BPF 118 and mixing the output of the second BPF 118 with a predetermined frequency to output a first baseband received signal.

The duplexer 110 transmits a wireless signal from the transmitter 100 through a first antenna 112, or supplies, to the first receiver 114, a wireless signal through the first antenna 112.

The second receiver 132, serving as the sub-receiver, includes a second LNA 134 for amplifying the received signal provided through the BPF unit 124, a high pass filter (HPF) 136 for receiving an output of the second LNA 134 and passing and outputting only a predetermined frequency band of the received signal, and a second mixer 138 for mixing an output of the HPF 136 with a predetermined frequency and outputting a second baseband received signal.

The BPF unit 124 includes third and fourth BPFs 126 and 130 connected in a serial fashion and a single switch 128. The switch 128 is connected to both ends of the third BPF 126, and is turned on/off according to a control operation of a controller 142. When the switch 128 is open, the received signal from the second antenna 122 is supplied to the second receiver 132 through the third and fourth BPFs 126 and 130. When the switch 128 is closed, the received signal from the second antenna 122 is supplied to the second receiver 132 only through the fourth BPF 130. The switch 128 is controlled by a modulator-demodulator (MODEM) 140.

The MODEM 140 includes the controller 142, a signal stabilizer 146, and an AGC controller 144. The controller 142 determines the presence of a transmission signal on the basis of an AGC signal received from the AGC controller 144 for controlling an AGC operation on the transmission signal, and controls the switch 128 based on the presence of the transmission signal.

The AGC controller 144 supplies the AGC circuit 106 with an AGC signal for controlling the AGC operation on the transmission signal. The signal stabilizer 146 stabilizes the AGC signal output from the AGC controller 144. The signal stabilizer 146 supplies the AGC circuit 106 and the controller 142 with the stabilized AGC signal.

Figure 3:
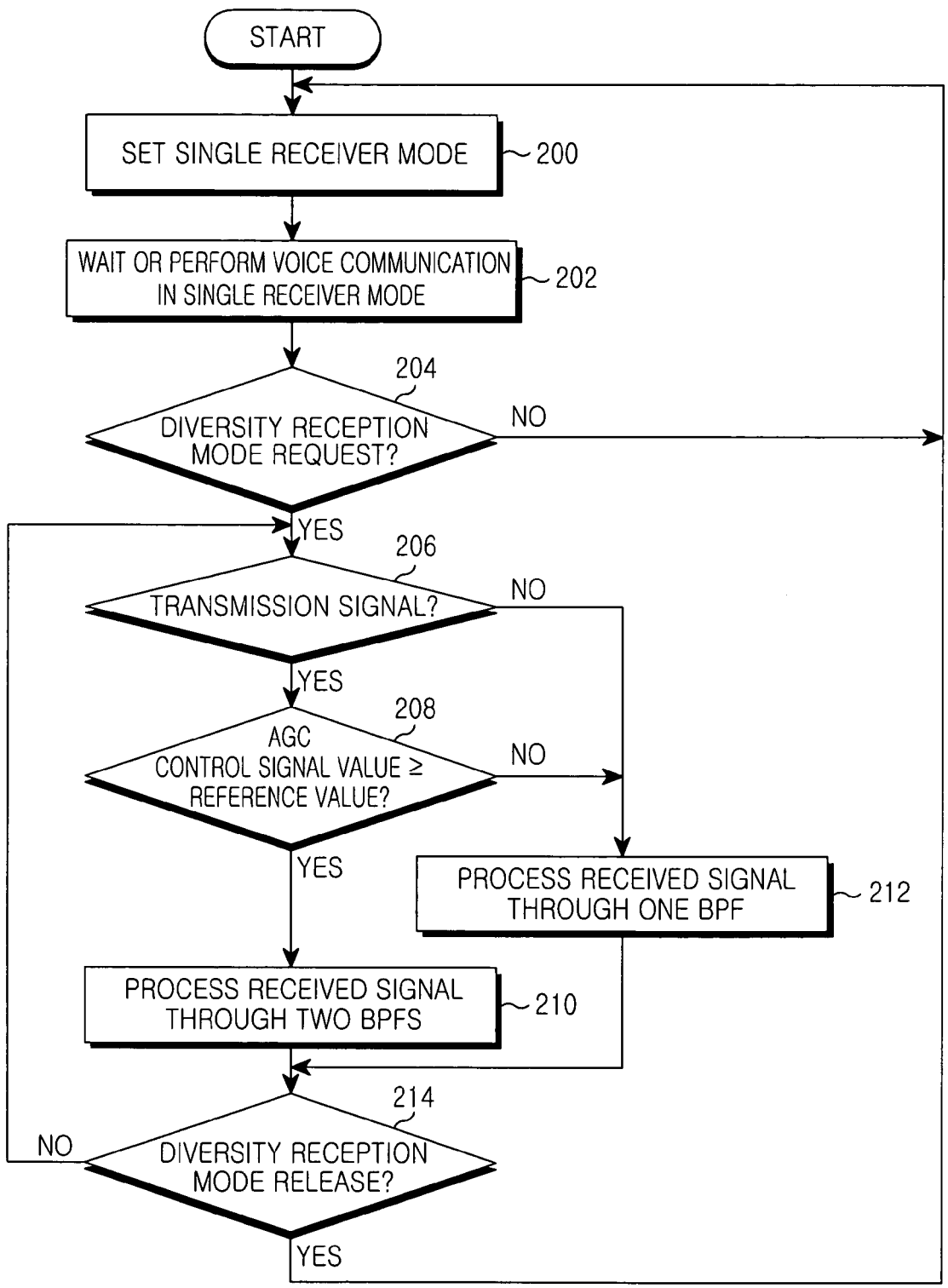
FIG. 3 is a flow chart illustrating a filter control method for use in the wireless transceiver in accordance with a preferred embodiment of the present invention.

A method for removing noise in the wireless transceiver in accordance with a preferred embodiment of the present invention will be described with reference to FIG. 3.

When the wireless transceiver is powered on and initialized, the controller 142 of the MODEM 140 sets the single receiver mode to serve as the operating mode for performing the wireless transmission and reception using the first receiver 114 serving as the main receiver (Step 200).

The controller 142 either remains idle in the single receiver mode or performs the wireless transmission and reception using the transmitter 100 and the first receiver 114 (Step 202).

The controller 142 determines if a user request or a diversity reception mode request based on a change of a wireless transmission and reception medium is present (Step 204). The diversity reception mode is the operating mode for performing the wireless transmission and reception using the second receiver 132 serving as the sub-receiver.

When the diversity reception mode request is present, the controller 142 determines a transmission operation based on the presence of a transmission signal (Step 206).

When no transmission signal is present, the controller 142 closes the switch 128 of the BPF unit 124, and controls a signal received from the second antenna 122 to be supplied to the second receiver 132 only through the fourth BPF 130 (Step 212), that is, the third BPF 126 is by passed.

If a transmission signal is present, the controller 142 receives an AGC signal for the transmitter 100. When a value of the AGC signal is equal to or greater than a predetermined reference value (Step 208), it is determined that the noise due to the transmission signal is present. However, when a value of the AGC signal is less than the predetermined reference value (Step 208), it is determined that the noise due to the transmission signal is not present. The predetermined reference value can be determined by a plurality of tests.

When the AGC signal value is less than the predetermined reference value, the controller 142 closes the switch 128 of the BPF unit 124, and controls a signal received from the second antenna 122 to be supplied to the second receiver 132 only through the fourth BPF 130 (Step 212).

When the AGC signal value is equal to or greater than the predetermined reference value, the controller 142 opens the switch 128 of the BPF unit 124, and controls a signal received through the second antenna 122 to be supplied to the second receiver 132 through the third and fourth BPFs 126 and 130 (Step 210).

Before a diversity reception mode release request is present, the controller 142 continuously opens and closes the switch 128 based on the presence of the transmission signal and a change of the AGC signal level.

The present invention can remove cross modulation (CM) noise in a wireless transceiver of a diversity structure with two receivers.

The present invention can remove CM noise without increasing a size of a sub-receiver.

The present invention controls the number of filters to be connected to a reception path based on the presence or level change of a transmission signal. For example, when a high-level transmission signal is present, a large number of filtering operations are performed to remove noise due to a transmitted signal. However, when no transmission signal is present or the transmission signal level is low, a small number of filtering operations are performed, such that reception sensitivity is not degraded.

Although preferred embodiments of the present invention have been disclosed for illustrative purposes, those skilled in the art will appreciate that various modifications, additions and substitutions are possible, without departing from the scope of the present invention. Therefore, the present invention is not limited to the above-described embodiments but is defined by the following claims, along with their full scope of equivalents.

What is claimed is:

1. A method for removing noise in a wireless transceiver, comprising the steps of:
sensing the presence of a transmission signal to be supplied to a transmitter of the wireless transceiver;
determining a level of the transmission signal;
performing a first number of filtering operations on a received signal to be input into a receiver of the wireless transceiver when a value of the transmission signal level is equal to or greater than a predetermined value; and
performing a second number of filtering operations on the received signal to be input into the receiver of the wireless transceiver when no transmission signal is present or the value of the transmission signal level is less than the predetermined value, the first number of filtering operations being greater than the second number of filtering operations.

2. The method according to claim 1, wherein the value of the transmission signal level is determined to be equal to or greater than the predetermined value when a level value of an auto gain control (AGC) signal for the transmitter is equal to or greater than a predetermined reference value.

3. The method according to claim 1, wherein the receiver is a sub-receiver in the wireless transceiver with a diversity structure.

4. An apparatus for removing noise in a wireless transceiver, comprising:
a transmitter for receiving a baseband transmission signal, converting the transmission signal into a signal capable of being wirelessly transmitted, and transmitting the wireless signal through a first antenna;
a first receiver for receiving a wireless signal through the first antenna and converting the received signal into a baseband received signal;
a duplexer for supplying the transmission signal from the transmitter to the first antenna, and supplying the received signal from the first antenna to the first receiver;
a second receiver for receiving a wireless signal through a second antenna and converting the received signal into a baseband received signal;
a filter unit, that includes at least two filters, connected between the second antenna and the second receiver, wherein the number of filters of the filter unit to be connected to a reception path is controlled according to a switching control signal; and
a modulator-demodulator (MODEM) for controlling the number of filters to be connected to the reception path by a presence and level of the transmission signal.

5. The apparatus according to claim 4, wherein if a value of the transmission signal level is determined to be equal to or greater than a predetermined value when a level value of an auto gain control (AGC) signal for the transmitter is equal to or greater than a predetermined reference value, a first number of filters are connected, the first number of filters being at least two.

6. The apparatus according to claim 4, wherein if a value of the transmission signal level is determined to be less than a predetermined value when a level value of an auto gain control (AGC) signal for the transmitter is less than a predetermined reference value, a second number of filters are connected, the second number of filters being determined to maintain reception sensitivity.

* * * * *